(12) United States Patent
Iwano (10) Patent No.: US 10,105,898 B2
(45) Date of Patent: Oct. 23, 2018

(54) RESIN JOINED BODY, MANUFACTURING METHOD OF RESIN JOINED BODY, AND VEHICLE STRUCTURE

(71) Applicant: TOYOTA JIDOSHA KABUSHIKI KAISHA, Toyota-shi, Aichi-ken (JP)

(72) Inventor: Yoshihiro Iwano, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 141 days.

(21) Appl. No.: 15/065,461

(22) Filed: Mar. 9, 2016

(65) Prior Publication Data

US 2016/0271865 A1 Sep. 22, 2016

(30) Foreign Application Priority Data

Mar. 20, 2015 (JP) ................... 2015-057793
Jul. 29, 2015 (JP) ................... 2015-149530

(51) Int. Cl.
*B29C 65/02* (2006.01)
*B29C 65/00* (2006.01)
(Continued)

(52) U.S. Cl.
CPC .......... *B29C 65/02* (2013.01); *B29C 66/1122* (2013.01); *B29C 66/322* (2013.01); *B29C 66/43* (2013.01); *B29C 66/7392* (2013.01); *B29C 66/7394* (2013.01); *B29C 65/04* (2013.01); *B29C 65/06* (2013.01); *B29C 65/0672* (2013.01); *B29C 65/08* (2013.01); *B29C 65/4815* (2013.01); *B29C 65/5057* (2013.01); *B29C 65/5071* (2013.01); *B29C 66/71* (2013.01); *B29C 66/721* (2013.01); *B29C 66/7212* (2013.01); *B29C 66/72141* (2013.01);
(Continued)

(58) Field of Classification Search
CPC .................................... B29C 66/1122
USPC ........................................... 428/63
See application file for complete search history.

(56) References Cited

U.S. PATENT DOCUMENTS 8,506,746 B2 8/2013 Korya et al.
2002/0136856 A1 9/2002 Sugimura et al.
(Continued)

FOREIGN PATENT DOCUMENTS

CN 103796816 A 5/2014
JP 2002-283455 A 10/2002
(Continued)

OTHER PUBLICATIONS

Pratt, Steven et al., "Method of Ultrasonically Welding Rim Parts Using Thermoplastic Inserts", Motorola Technical Developments, Motorola Inc., Schaumburg, Illinois, U.S., vol. 27, May 1, 1996, p. 200-201.

*Primary Examiner* — Brent T O'Hern
(74) *Attorney, Agent, or Firm* — Oliff PLC (57) ABSTRACT

A resin joined body includes a thermoplastic resin molded body and a thermosetting resin molded body. The thermosetting resin molded body has a thermoplastic resin portion embedded in the thermosetting resin molded body and exposed at a portion of a surface of the thermosetting resin molded body. The thermoplastic resin portion of the thermosetting resin molded body is welded to the thermoplastic resin molded body thereby joining the thermosetting resin molded body to the thermoplastic resin molded body.

14 Claims, 4 Drawing Sheets

(51) Int. Cl.
　　　*B29C 65/06*　　　(2006.01)
　　　*B29C 65/08*　　　(2006.01)
　　　*B29C 65/48*　　　(2006.01)
　　　*B29C 65/50*　　　(2006.01)
　　　*B29C 65/04*　　　(2006.01)
　　　*B29L 31/30*　　　(2006.01)

(52) U.S. Cl.
　　　CPC ........ *B29C 66/929* (2013.01); *B29C 66/9513* (2013.01); *B29C 66/9517* (2013.01); *B29L 2031/30* (2013.01)

(56) References Cited

U.S. PATENT DOCUMENTS

| | | |
|---|---|---|
| 2011/0240200 A1 | 10/2011 | Korya et al. |
| 2013/0064601 A1 | 3/2013 | Toyama |
| 2014/0220356 A1 | 8/2014 | Van Tooren |

FOREIGN PATENT DOCUMENTS

| | | | |
|---|---|---|---|
| JP | 2003-285375 A | 10/2003 | |
| JP | 2008-230238 A | 10/2008 | |
| JP | 2013-028159 A | 2/2013 | |
| JP | 2013-059883 A | 4/2013 | |
| JP | 2014-076565 A | 5/2014 | |
| KR | 10-2014-0049989 A | 4/2014 | |
| WO | 2007/109855 A1 | 10/2007 | |
| WO | WO-2007109855 A1 * | 10/2007 | ......... B29C 65/0627 |
| WO | 2012/161569 A1 | 11/2012 | |

* cited by examiner

RESIN JOINED BODY, MANUFACTURING METHOD OF RESIN JOINED BODY, AND VEHICLE STRUCTURE

INCORPORATION BY REFERENCE

The disclosure of Japanese Patent Application No. 2015-057793 and 2015-149530 filed on Mar. 20, 2015 and Jul. 29, 2015 including the specification, drawings and abstract is incorporated herein by reference in its entirety.

BACKGROUND

1. Technical Field

The disclosure relates to a resin joined body, a manufacturing method of a resin joined body, and a vehicle structure.

2. Description of Related Art

The use of resin parts in next-generation vehicle bodies is expected to increase. Accordingly, there is an urgent need to establish a joining method for joining resin parts together.

Japanese Patent Application Publication No. 2014-076565 (JP 2014-076565 A), for example, describes a joining method that joins fiber-reinforced thermoplastic resins together via a thermoplastic resin sheet arranged between the fiber-reinforced thermoplastic resins, in order to join fiber-reinforced thermoplastic resins together.

Japanese Patent Application Publication No. 2008-230238 (JP 2008-230238 A), for example, describes a fiber-reinforced composite material plate that includes a thermosetting resin and a thermoplastic resin.

Furthermore, Japanese Patent Application Publication No. 2013-028159 (JP 2013-028159 A), for example, describes a manufacturing method of a composite molded body that involves forming a resin body integrated preform by joining a resin body made of a resin B to a portion of a surface of a fiber-reinforced resin A in advance, arranging the resin body integrated preform in a die, and performing insert molding using the same kind of resin as the resin B.

SUMMARY

Typically, a resin part with thermosetting resin hardened material is joined to a resin part with thermoplastic resin by joining using an adhesive, or fixing using a fastening member such as a rivet.

However, the technology described in JP 2014-076565 A is used to join together thermoplastic resins that have plasticity, and is not applicable to joining a thermoplastic resin to thermosetting resin hardened material in which the curing reaction is already complete and that thus does not easily plasticize. Also, using an adhesive or a fastening member such as a rivet to join a resin part with thermosetting resin hardened material to a resin part with thermoplastic resin contributes to an increase in mass or cost, which is undesirable. In particular, when a thermoplastic resin is joined to a thermosetting resin hardened material using an adhesive, the strength of the joint is determined by the strength of the adhesive, so there may be times when the material strength of the resin part itself is unable to be taken advantage of. Moreover, the technology described in JP 2008-230238 A is applied to the manufacturing of a fiber-reinforced composite material plate with a thermoplastic resin and an uncured thermosetting resin, and is not applicable to joining a thermoplastic resin to thermosetting resin hardened material in which the curing reaction is already complete. Also, the technology described in JP 2013-028159 A is not designed to join resin parts together.

The embodiments thus provide a resin joined body in which a thermoplastic resin molded body is joined to a thermosetting resin molded body without using an adhesive or a fastening member such as a rivet, as well as a manufacturing method of this resin joined body, and a vehicle structure having this resin joined body.

A first aspect relates to a resin joined body that includes a thermoplastic resin molded body and a thermosetting resin molded body. The thermosetting resin molded body has a thermoplastic resin portion embedded in the thermosetting resin molded body and exposed at a portion of a surface of the thermosetting resin molded body. The thermoplastic resin portion of the thermosetting resin molded body is welded to the thermoplastic resin molded body thereby joining the thermosetting resin molded body to the thermoplastic resin molded body.

According to this first aspect, the thermoplastic resin molded body is joined to the thermosetting resin molded body by welding the thermoplastic resin molded body to the thermoplastic resin portion provided exposed on the portion of the surface of the thermosetting resin molded body. Therefore, a resin joined body in which a thermoplastic resin molded body and a thermosetting resin molded body are joined together without using an adhesive or a fastening member such as a rivet is obtained.

In the first aspect described above, the thermoplastic resin portion may include an anchor portion, a joining portion, and a connecting portion that connects the anchor portion to the joining portion. The anchor portion is embedded in the thermosetting resin molded body. The joining portion is exposed on a portion of the surface of the thermosetting resin molded body and is welded to the thermoplastic resin molded body.

According to this aspect, the joining portion that is exposed on a portion of the surface of the thermosetting resin molded body and is welded to the thermoplastic resin molded body is connected via the connecting member to the anchor portion that is embedded in the thermosetting resin molded body. Therefore, the peeling strength of the thermoplastic resin portion from the thermosetting resin molded body improves, and when the thermoplastic resin molded body is joined to the thermosetting resin molded body by welding the thermoplastic resin molded body to the thermoplastic resin portion, the joint strength between the thermoplastic resin molded body and the thermosetting resin molded body improves.

In the first aspect described above, the thermoplastic resin molded body may include fibers therein.

According to this aspect, the thermoplastic resin molded body includes fibers therein, so when the thermoplastic resin molded body is joined to the thermoplastic resin portion by welding, the fibers included in the thermoplastic resin molded body enter the thermoplastic resin portion. Therefore, the joint strength between the thermoplastic resin molded body and the thermosetting resin molded body via the thermoplastic resin portion improves.

In the first aspect described above, the thermoplastic resin portion may include fibers therein.

In this aspect, the thermoplastic resin portion provided exposed on a portion of the surface of the thermosetting resin molded body includes fibers, so when the thermoplastic resin molded body is joined to the thermoplastic resin portion by welding, the fibers included in the thermoplastic resin portion enter the thermoplastic resin molded body. Therefore, the joint strength between the thermoplastic resin molded body and the thermosetting resin molded body via the thermoplastic resin portion improves.

In the first aspect described above, the thermosetting resin molded body may have at least two of the thermoplastic resin portions.

According to this aspect, the joint between the thermoplastic resin molded body and the thermosetting resin molded body is provided in at least two locations, so the joint strength between the thermoplastic resin molded body and the thermosetting resin molded body improves.

A second aspect relates to a manufacturing method of a resin joined body. This manufacturing method includes preparing a thermoplastic resin molded body; preparing a thermosetting resin molded body that includes a thermoplastic resin portion embedded in the thermosetting resin molded body and that is exposed at a portion of a surface of the thermosetting resin molded body; and joining the thermoplastic resin molded body to the thermosetting resin molded body by welding the thermoplastic resin molded body to the thermoplastic resin portion of the thermosetting resin molded body.

According to this aspect, the thermoplastic resin molded body and the thermosetting resin molded body are joined together by welding via the thermoplastic resin portion provided exposed at a portion of the surface of the thermosetting resin molded body. Therefore, the thermoplastic resin molded body and the thermosetting resin molded body are joined together without using an adhesive or a fastening member such as a rivet.

In the second aspect described above, the thermoplastic resin molded body may include fibers therein.

According to this aspect, the thermoplastic resin molded body includes fibers, so when the thermoplastic resin molded body is joined to the thermoplastic resin portion by welding, the fibers included in the thermoplastic resin molded body enter the thermoplastic resin portion. Therefore, the joint strength between the thermoplastic resin molded body and the thermosetting resin molded body via the thermoplastic resin portion improves.

In the second aspect described above, the thermoplastic resin portion may include fibers therein.

In this aspect, the thermoplastic resin portion provided exposed on a portion of the surface of the thermosetting resin molded body includes fibers, so when the thermoplastic resin molded body is joined to the thermoplastic resin portion by welding, the fibers included in the thermoplastic resin portion enter the thermoplastic resin molded body. Therefore, the joint strength between the thermoplastic resin molded body and the thermosetting resin molded body via the thermoplastic resin portion improves.

In the second aspect described above, the thermosetting resin molded body may have at least two of the thermoplastic resin portions.

According to this aspect, the joint between the thermoplastic resin molded body and the thermosetting resin molded body is provided in at least two locations, so the joint strength between the thermoplastic resin molded body and the thermosetting resin molded body improves.

In the aspect described above, the thermoplastic resin portion may include an anchor portion, a joining portion, and a connecting portion that connects the anchor portion to the joining portion. The anchor portion is embedded in the thermosetting resin molded body. The joining portion is exposed on a portion of the surface of the thermosetting resin molded body and welded to the thermoplastic resin molded body.

According to this aspect, the joining portion that is exposed on a portion of the surface of the thermosetting resin molded body and welded to the thermoplastic resin molded body is connected via the connecting portion to the anchor portion that is embedded in the thermosetting resin molded body. Therefore, the peeling strength of the thermoplastic resin portion from the thermosetting resin molded body improves, and when the thermoplastic resin molded body is joined to the thermosetting resin molded body by welding the thermoplastic resin molded body to the thermoplastic resin portion, the joint strength between the thermoplastic resin molded body and the thermosetting resin molded body improves.

In the second aspect described above, the thermoplastic resin portion may include an anchor portion and a protruding portion. The anchor portion is embedded in the thermosetting resin molded body. The protruding portion is connected to the anchor portion and protrudes from the anchor portion and through the surface of the thermosetting resin molded body.

According to this aspect, the protruding portion protrudes from the anchor portion embedded in the thermosetting resin molded body and through the surface of the thermosetting resin molded body. Therefore, when the thermoplastic resin molded body is joined to the thermosetting resin molded body by welding the thermoplastic resin molded body to the thermoplastic resin portion, a tip portion of the protruding portion contacts the thermoplastic resin molded body. When the thermoplastic resin molded body is welded to the thermoplastic resin portion while the tip end of the protruding portion is contacting the thermoplastic resin molded body, the tip end of the protruding portion generates heat easily so heat generating efficiency improves. As a result, workability and weldability improve. Furthermore, the thermoplastic resin portion has the anchor portion that is embedded in the thermosetting resin molded body, so the peeling strength of the thermoplastic resin portion from the thermosetting resin molded body improves, and when the thermoplastic resin molded body is joined to the thermosetting resin molded body by welding the thermoplastic resin molded body to the thermoplastic resin portion, the joint strength between the thermoplastic resin molded body and the thermosetting resin molded body improves.

In the second aspect described above, a groove may be provided in the surface of the thermosetting resin molded body around a portion where the thermoplastic resin portion is exposed.

According to this aspect, by providing the groove around the portion where the thermoplastic resin portion is exposed, at least some of the weld flash generated when joining the thermoplastic resin molded body to the thermosetting resin molded body by welding the thermoplastic resin molded body to the thermoplastic resin portion can be filled into the groove. Therefore, the amount of weld flash generated at the location where the thermoplastic resin molded body is joined to the thermosetting resin molded body is reduced, so the weld is able to be even stronger.

A vehicle structure may include the resin joined body described in the first aspect described above.

According to this aspect, the thermoplastic resin molded body and the thermosetting resin molded body are joined together by welding via the thermoplastic resin portion provided exposed on a portion of the surface of the thermosetting resin molded body, so a vehicle structure that has a resin joined body in which a thermoplastic resin molded body is joined to a thermosetting resin molded body without using an adhesive or a fastening member such as a rivet is obtained.

Another aspect relates to a resin joined body that includes a thermoplastic resin molded body and a thermosetting resin molded body. The thermosetting resin molded body includes a thermoplastic resin portion. This thermoplastic resin portion is exposed on a portion of a surface of the thermosetting resin molded body and is joined to the thermoplastic resin molded body by welding.

According to the aspects, a resin joined body in which a thermoplastic resin molded body is joined to a thermosetting resin molded body without using an adhesive or a fastening member such as a rivet, as well as a manufacturing method of this resin joined body, and a vehicle structure having this resin joined structure, are provided.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinafter, example embodiments of a resin joined body, a manufacturing method of the resin joined body, and a vehicle structure having the resin joined body will be described in detail.

Figure 1:
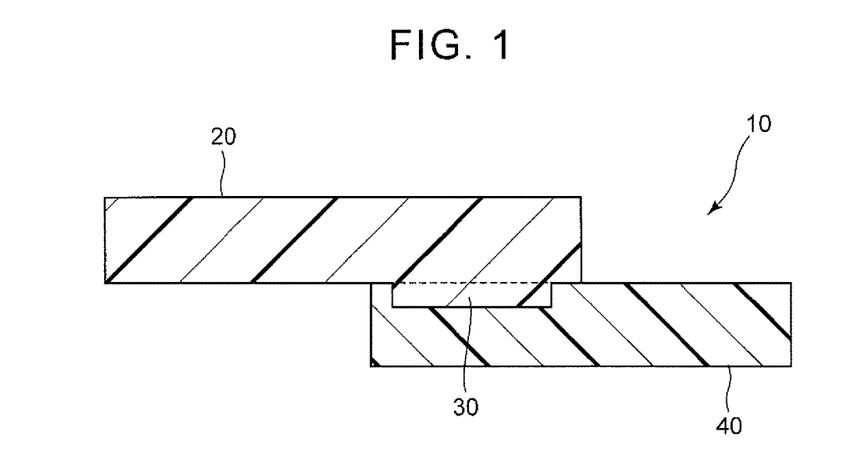
FIG. 1 is a sectional view of one example of a resin joined body according to an example embodiment.

Example embodiments of the resin joined body will now be described with reference to the accompanying drawings. FIG. 1 is a sectional view of one example of a resin joined body according to this example embodiment. In FIG. 1, a resin joined body 10 is formed by joining a thermoplastic resin molded body 20 to a thermoplastic resin portion 30 of a thermosetting resin molded body 40 that has the thermoplastic resin portion 30 provided exposed on a portion of a surface of the thermosetting resin molded body 40, by welding.

The thermoplastic resin that forms the thermoplastic resin molded body 20 is not particularly limited, i.e., any one of a variety of well-known thermoplastic resins may be used depending on the purpose. Some examples of the thermoplastic resin that may be used in this example embodiment include polycarbonate resin, polyamide (PA) resin, polyurethane (PU) resin, polyvinyl chloride resin, acrylonitrile-butadiene-styrene copolymer (ABS) resin, and polypropylene (PP) resin. Of these, PA resin and PP resin are preferable.

The thermoplastic resin that forms the thermoplastic resin portion 30 is not particularly limited, i.e., any one of a variety of well-known thermoplastic resins may be used depending on the purpose. Some examples of the thermoplastic resin that may be used in this example embodiment include polycarbonate resin, polyamide (PA) resin, polyurethane (PU) resin, polyvinyl chloride resin, acrylonitrile-butadiene-styrene copolymer (ABS) resin, and polypropylene (PP) resin. Of these, PA resin and PP resin are preferable.

The thermoplastic resin that forms the thermoplastic resin molded body 20 and the thermoplastic resin that forms the thermoplastic resin portion 30 may be the same type or different types of thermoplastic resin. In this example embodiment, the thermoplastic resin that forms the thermoplastic resin molded body 20 and the thermoplastic resin that forms the thermoplastic resin portion 30 are preferably the same type of thermoplastic resin.

The thermosetting resin molded body 40 is hardened material that is the result of thermally hardening thermosetting resin. The thermosetting resin used to form the hardened material is not particularly limited, i.e., any one of a variety of well-known thermosetting resins may be used depending on the purpose. Some examples of the thermosetting resin that may be used in this example embodiment include vinylester resin, unsaturated polyester resin, phenol resin, epoxy resin, and urethane resin. Of these, epoxy resin is preferable.

The forming method of the thermoplastic resin molded body 20 is not particularly limited, i.e., any one of a variety of well-known methods may be used depending on the purpose. Some examples of the forming method that may be used in this example embodiment include injection molding, extrusion molding, blow molding, and powder molding.

The forming method of the thermosetting resin molded body 40 is not particularly limited. For example, a thermosetting resin molded body 40 with an integrated thermoplastic resin portion 30 may be formed by forming the thermoplastic resin portion 30 by injection molding, extrusion molding, blow molding, powder molding, calendaring molding, or laminate molding or the like, and then forming the thermosetting resin molded body 40 by insert molding or the like using this formed thermoplastic resin portion 30.

The thermoplastic resin molded body 20 may also include a fiber. The type of fiber used in the thermoplastic resin molded body 20 is not particularly limited, i.e., any one of a variety of well-known fibers may be used depending on the purpose. Some examples of the type of fiber that may be used in the thermoplastic resin molded body 20 include a resin fiber such as aramid fiber, cellulose fiber, nylon fiber, vinylon fiber, polyester fiber, polyolefin fiber, rayon fiber, carbon fiber, glass fiber, and metallic fiber. Of these, carbon fiber that is able to realize high mechanical strength is desirable.

The thermoplastic resin portion 30 may also include a fiber. The type of fiber used in the thermoplastic resin portion 30 is not particularly limited, i.e., any one of a variety of well-known fibers may be used depending on the purpose. Some examples of the type of fiber that may be used in the thermoplastic resin portion 30 include a resin fiber such as aramid fiber, cellulose fiber, nylon fiber, vinylon fiber, polyester fiber, polyolefin fiber, rayon fiber, carbon fiber, glass fiber, and metallic fiber. Of these, carbon fiber that is able to realize high mechanical strength is desirable.

The thermosetting resin molded body 40 may also include a fiber. The type of fiber used in the thermosetting resin molded body 40 is not particularly limited, i.e., any one of a variety of well-known fibers may be used depending on the purpose. Some examples of the type of fiber that may be used in the thermosetting resin molded body 40 include a resin fiber such as aramid fiber, cellulose fiber, nylon fiber, vinylon fiber, polyester fiber, polyolefin fiber, rayon fiber, carbon fiber, glass fiber, and metallic fiber. Of these, carbon fiber that is able to realize high mechanical strength is desirable.

The state of the fiber used in this example embodiment is not particularly limited, i.e., fiber of a well-known state may be used depending on the purpose. Some examples of the state of fiber that may be used in this example embodiment include woven and nonwoven.

The structure of the thermoplastic resin portion 30 is not particularly limited. The thermoplastic resin portion 30 may have a sheet shape as shown in FIG. 1, or it may have an anchor portion embedded in the thermosetting resin molded body, a joining portion that is exposed on a portion of the surface of the thermosetting resin molded body and welded to the thermoplastic resin molded body 20, and a connecting portion that connects the anchor portion to the joining portion. The thermoplastic resin portion 30 will not easily detach from the thermosetting resin molded body 40 because the thermoplastic resin portion 30 has the anchor portion, the joining portion, and the connecting portion. Therefore, the peeling strength of the thermoplastic resin portion 30 from the thermosetting resin molded body 40 improves, and the joint strength between the thermoplastic resin molded body 20 and the thermosetting resin molded body 40 improves.

In the resin joined body according to this example embodiment, the number of thermoplastic resin portions 30 provided on the thermosetting resin molded body 40 is not particularly limited. In FIG. 1, there is only one thermoplastic resin portion 30 provided on the thermosetting resin molded body 40, but there may also be two or more thermoplastic resin portions 30 provided on the thermosetting resin molded body 40. The number of thermoplastic resin portions 30 may be selected to match the required joint strength between the thermoplastic resin molded body 20 and the thermosetting resin molded body 40.

The method for compounding thermoplastic resin and fiber to obtain the thermoplastic resin molded body 20 or the thermoplastic resin portion 30 is not particularly limited. Any one of a variety of well-known methods may be used depending on the purpose. For example, a method that involves impregnating the fiber with a melt or liquid solution of thermoplastic resin, then drying the impregnated fiber as necessary and molding it into a sheet shape may be used, or a method that involves alternately layering fiber and a thermoplastic resin film, and then thermal compression molding the layered fibers and thermoplastic resin films may be used. The method for compounding thermosetting resin and fiber to obtain the thermosetting resin molded body 40 is also not particularly limited. Any one of a variety of well-known methods may be used depending on the purpose. Prepreg in which thermosetting resin and fiber have been compounded may be used to manufacture the thermosetting resin molded body 40.

Next, an example embodiment of a manufacturing method of the resin joined body will be described with reference to the drawings. In the description below, like members that are the same as those in the example embodiment of the resin joined body will be denoted by like reference characters, and redundant descriptions may be omitted. The sizes of the members in the drawings are conceptual, and the relative relationship of size between members is not limited to what is shown.

Figure 2:
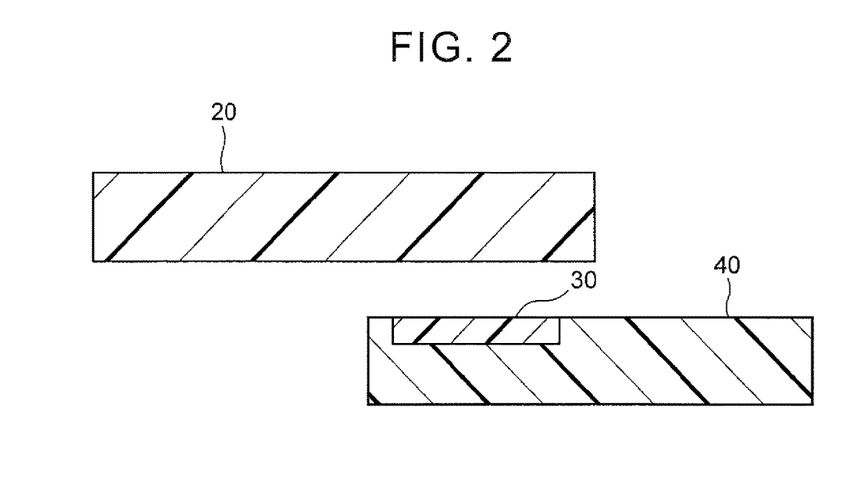
FIG. 2 is a sectional view illustrating a manufacturing method of a resin joined body according to a first example embodiment.

FIG. 2 is a sectional view illustrating a manufacturing method of the resin joined body according to a first example embodiment. In the manufacturing method of the resin joined body according to the first example embodiment, the thermoplastic resin molded body 20, and the thermosetting resin molded body 40 having the thermoplastic resin portion 30 provided exposed on a portion of the surface, are prepared. The method for preparing the thermoplastic resin molded body 20 and the thermosetting resin molded body 40 are not particularly limited. For example, the thermoplastic resin molded body 20 and the thermosetting resin molded body 40 may be manufactured by a person performing a process of joining the thermoplastic resin molded body 20 and the thermosetting resin molded body 40 himself or herself, which will be described later, or the thermoplastic resin molded body 20 and the thermosetting resin molded body 40 may be acquired by purchase or the like. The material and method and the like used to manufacture the thermoplastic resin molded body 20 and the thermosetting resin molded body 40 are as described above.

In FIG. 2, the shape of the thermoplastic resin portion 30 provided exposed on a portion of the surface of the thermosetting resin molded body 40 is sheet-shaped.

In the manufacturing method of the resin joined body according to the first example embodiment, the resin joined body 10 is manufactured by joining the thermoplastic resin molded body 20 to the thermosetting resin molded body 40 by welding the thermoplastic resin molded body 20 to the thermoplastic resin portion 30.

The method for joining the thermoplastic resin molded body 20 to the thermosetting resin molded body 40 by welding the thermoplastic resin molded body 20 to the thermoplastic resin portion 30 is not particularly limited, i.e., any of a variety of well-known welding methods may be used. Some examples of the welding method that may be used in this example embodiment include ultrasonic welding, vibration welding, induction welding, high-frequency welding, laser welding, thermal welding, and spin welding. Of these, ultrasonic welding and vibration welding are preferable.

The strength of the resin joined body is further improved by using vibration welding as the welding method. On the other hand, the degree of freedom in structure and design of the joined thermoplastic resin molded body and the thermosetting resin molded body increases using ultrasonic welding as the welding method.

Vibration welding is a method by which one resin molded body (i.e., either the thermoplastic resin molded body or the thermosetting resin molded body) is oscillated horizontally against a contact surface of the other resin molded body (i.e., the thermosetting resin molded body or the thermoplastic resin molded body) while a load is applied to the thermoplastic resin molded body and the thermosetting resin molded body that are to be welded together, using a press or the like, and the two resin molded bodies are welded together using the frictional heat generated by this vibration.

On the other hand, ultrasonic welding is a method by which electrical energy is converted into vibration energy by an ultrasonic oscillator, and this vibration energy is applied to contact surfaces of the thermoplastic resin molded body and the thermosetting resin molded body that are contacting one another, such that the two resin molded bodies are welded together using the frictional heat generated in the contact surfaces.

In the manufacturing method of the resin joined body according to the first example embodiment, the number of thermoplastic resin portions 30 provided on the thermosetting resin molded body 40 is not particularly limited. In FIG. 2, there is only one thermoplastic resin portion 30 provided on the thermosetting resin molded body 40, but there may also be two or more thermoplastic resin portions 30 provided on the thermosetting resin molded body 40. The number of thermoplastic resin portions 30 may be selected to match the required joint strength between the thermoplastic resin molded body 20 and the thermosetting resin molded body 40.

Also, by having two or more of the thermoplastic resin portions 30 provided on the thermosetting resin molded body 40, weld flash generated when the thermoplastic resin molded body 20 is welded to the thermoplastic resin portions 30 (i.e., excess thermoplastic resin generated when joining the thermoplastic resin molded body 20 to the thermosetting resin molded body 40 by welding) is interposed between the thermosetting resin molded body 40 and the thermoplastic resin molded body 20, so the joint strength between the thermoplastic resin molded body 20 and the thermosetting resin molded body 40 is further improved.

Figure 3:
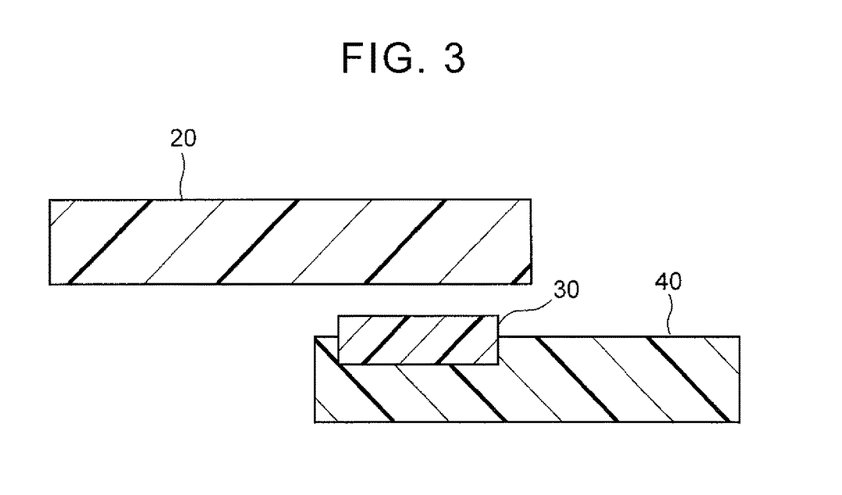
FIG. 3 is a sectional view illustrating a modified example of the manufacturing method of a resin joined body according to the first example embodiment.

FIG. 3 is a sectional view illustrating a modified example of the manufacturing method of the resin joined body according to the first example embodiment. As shown in FIG. 3, the thermoplastic resin portion 30 may also be provided protruding from a surface of the thermosetting resin molded body 40.

Figure 4:
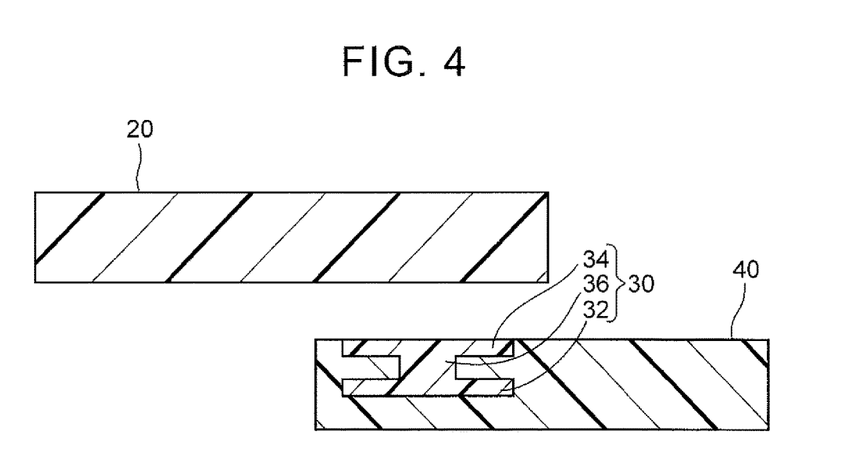
FIG. 4 is a sectional view illustrating a manufacturing method of a resin joined body according to a second example embodiment.

FIG. 4 is a sectional view illustrating a manufacturing method of a resin joined body according to a second example embodiment. In the manufacturing method of the resin joined body according to this second example embodiment, the thermoplastic resin portion 30 has an anchor portion 32 that is embedded in the thermosetting resin molded body 40, a joining portion 34 that is exposed on a portion of the surface of the thermosetting resin molded body 40 and welded to the thermoplastic resin molded body 20, and a connecting portion 36 that connects the anchor portion 32 to the joining portion 34.

In the manufacturing method of the resin joined body according to the second example embodiment, the joining portion 34 is connected via the connecting portion 36 to the anchor portion 32 that is embedded in the thermosetting resin molded body 40, so the thermoplastic resin portion 30 will not easily detach from the thermosetting resin molded body 40. Therefore, the peeling strength of the thermoplastic resin portion 30 from the thermosetting resin molded body 40 improves, so the joint strength between the thermoplastic resin molded body 20 and the thermosetting resin molded body 40 improves.

The welding method in the manufacturing method of the resin joined body according to the second example embodiment is preferably ultrasonic welding or vibration welding, and more preferably vibration welding.

In the manufacturing method of the resin joined body according to the second example embodiment, the number of thermoplastic resin portions 30 provided on the thermosetting resin molded body 40 is not particularly limited. In FIG. 4, there is only one thermoplastic resin portion 30 provided on the thermosetting resin molded body 40, but there may also be two or more thermoplastic resin portions 30 provided on the thermosetting resin molded body 40. The number of thermoplastic resin portions 30 may be selected to match the required joint strength between the thermoplastic resin molded body 20 and the thermosetting resin molded body 40.

Also, by having two or more of the thermoplastic resin portions 30 provided on the thermosetting resin molded body 40, weld flash generated when the thermoplastic resin molded body 20 is welded to the they resin portions 30 is interposed between the thermosetting resin molded body 40 and the thermoplastic resin molded body 20, so the joint strength between the thermoplastic resin molded body 20 and the thermosetting resin molded body 40 further improves.

Figure 5:
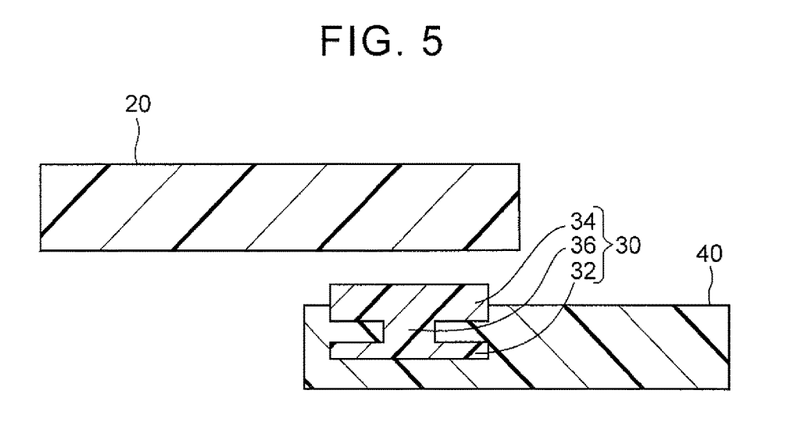
FIG. 5 is a sectional view illustrating a modified example of the manufacturing method of a resin joined body according to the second example embodiment.

FIG. 5 is a sectional view illustrating a modified example of the resin joined body according to the second example embodiment. As shown in FIG. 5, the joining portion 34 of the thermoplastic resin portion 30 may also be provided protruding from a surface of the thermosetting resin molded body 40.

Figure 6:
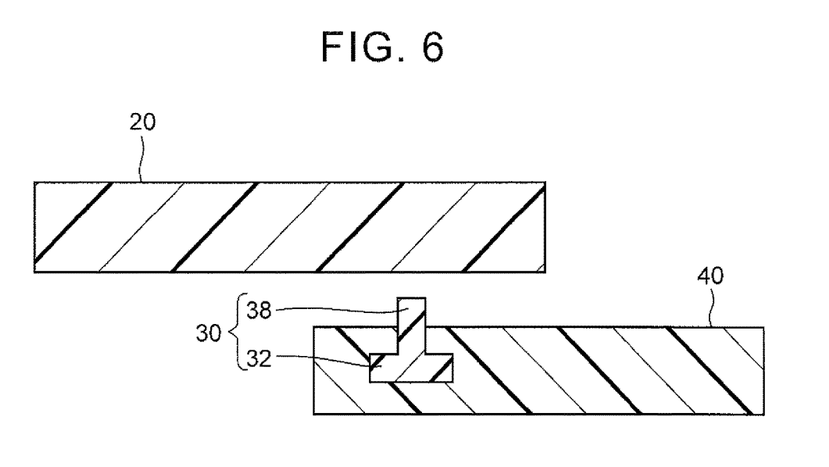
FIG. 6 is a sectional view illustrating a manufacturing method of a resin joined body according to a third example embodiment.

FIG. 6 is a sectional view illustrating a manufacturing method of a resin joined body according to a third example embodiment. In the manufacturing method of the resin joined body according to this third example embodiment, the thermoplastic resin portion 30 has an anchor portion 32 that is embedded in the thermosetting resin molded body 40, and a protruding portion 38 provided protruding from the anchor portion 32 toward the surface of the thermosetting resin molded body 40 and protruding from this surface.

Therefore, when the thermoplastic resin molded body 20 is joined to the thermosetting resin molded body 40 by welding the thermoplastic resin molded body 20 to the thermoplastic resin portion 30, a tip end of the protruding portion 38 contacts the thermoplastic resin molded body 20. When vibration welding is performed, for example, while the tip end of the protruding portion 38 is contacting the thermoplastic resin molded body 20, the tip end of the protruding portion 38 generates heat easily by the friction so heat generating efficiency improves, and the protruding portion 38 is able to be easily joined to the thermoplastic resin molded body 20. As a result, workability and weldability improve.

The area of the protruding portion 38 when viewed from a direction orthogonal to the joining surface of the thermosetting resin molded body 40 that joins with the thermoplastic resin molded body 20 is preferably smaller than the area of the anchor portion 32 when viewed from a direction orthogonal to the joining surface of the thermosetting resin molded body 40 that joins with the thermoplastic resin molded body 20. Making the area of the protruding portion 38 small makes it possible to further increase the contact pressure between the protruding portion 38 and the thermoplastic resin molded body 20 when performing vibration welding, for example, while the tip end of the protruding portion 38 is contacting the thermoplastic resin molded body 20, and thus further improves heat generating efficiency.

Furthermore, the thermoplastic resin portion 30 has the anchor portion 32 embedded in the thermosetting resin molded body 40, so the thermoplastic resin portion 30 will not easily detach from the thermosetting resin molded body 40. Therefore, the peeling strength of the thermoplastic resin portion 30 from the thermosetting resin molded body 40 improves, so the joint strength between the thermoplastic resin molded body 20 and the thermosetting resin molded body 40 improves.

In the manufacturing method of the resin joined body according to the third example embodiment, the number of thermoplastic resin portions 30 provided on the thermosetting resin molded body 40 is not particularly limited. In FIG. 6, there is only one thermoplastic resin portion 30 provided on the thermosetting resin molded body 40, but there may also be two or more thermoplastic resin portions 30 provided on the thermosetting resin molded body 40. The number of thermoplastic resin portions 30 may be selected to match the required joint strength between the thermoplastic resin molded body 20 and the thermosetting resin molded body 40.

Also, by having two or more of the thermoplastic resin portions 30 provided on the thermosetting resin molded body 40, weld flash generated when the thermoplastic resin molded body 20 is welded to the thermoplastic resin portions 30 is interposed between the thermosetting resin molded body 40 and the thermoplastic resin molded body 20, so the joint strength between the thermoplastic resin molded body 20 and the thermosetting resin molded body 40 further improves.

Vibration welding is preferable as the welding method in the manufacturing method of the resin joined body according to the third example embodiment.

Figure 7:
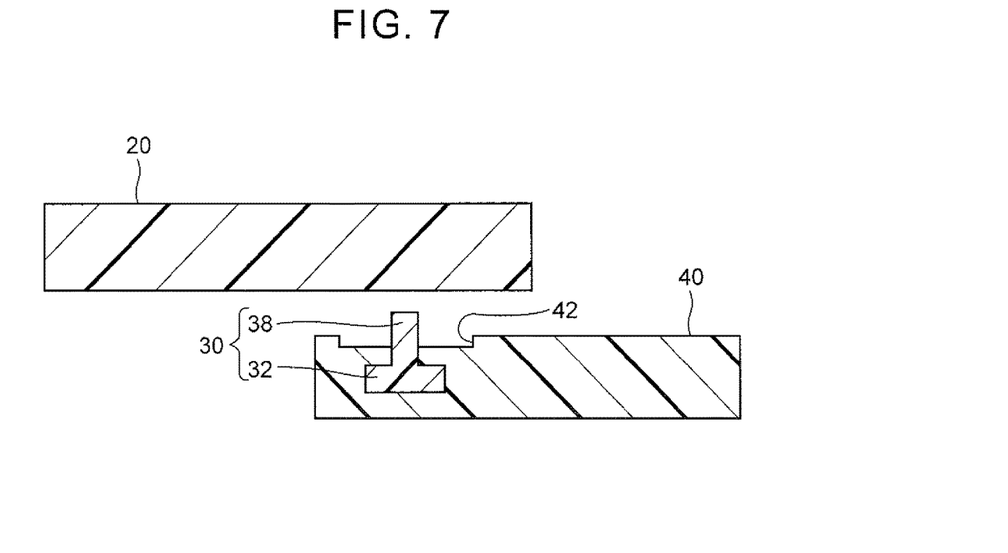
FIG. 7 is a sectional view illustrating a manufacturing method of a resin joined body according to a fourth example embodiment.

FIG. 7 is a sectional view illustrating a manufacturing method of a resin joined body according to a fourth example embodiment. In the manufacturing method of the resin joined body according to the fourth example embodiment, a groove 42 is provided in the thermosetting resin molded body 40 around an exposed portion of the thermoplastic resin portion 30.

The size of the groove 42 is not particularly limited. By estimating the amount of generated weld flash of the thermoplastic resin from the penetration amount of thermoplastic resin molded body 20 and thermosetting resin molded body 40 when welding the thermoplastic resin molded body 20 to the thermoplastic resin portion 30, and setting the volume of the groove 42 to match the amount of generated weld flash, the majority of the weld flash that is generated is able to be filled into the groove 42. Therefore, the amount of weld flash generated in the location where the thermoplastic resin molded body 20 and the thermosetting resin molded body 40 are joined together is able to be further reduced, which is desirable.

With the manufacturing method of the resin joined body according to the fourth example embodiment, the thermoplastic resin portion 30 has the anchor portion 32 and the protruding portion 38, but the structure of the thermoplastic resin portion 30 is not particularly limited.

A vehicle structure according to the example embodiment has the resin joined body according to the example embodiment described above. The type of vehicle structure according to the example embodiment is not particularly limited. For example, the vehicle structure may be a side door, a hood, a roof, a back door, a luggage compartment door, a bumper, or a crash box.

Typically, a thermosetting resin molded body has a smoother surface than a thermoplastic resin molded body, so when forming a door as a vehicle structure using the resin joined body according to this example embodiment, for example, the surface side of the door is preferably formed by the thermosetting resin molded body of the resin joined body.

The vehicle structure according to the example embodiment makes it possible to form a resin vehicle structure by combining suitable resin materials for each portion according to the characteristics that are required. Therefore, the vehicle structure according to the example embodiment enables a next-generation vehicle that uses a combination of a plurality of types of resins (multi-materials) to be realized.

Below, the example embodiment will be described in more detail based on an example, but the example embodiment is in no way limited to this example.

(Preparation of a Test Piece)

CFRP (continuous fiber prepreg material) 3K woven material made by Toray Industries, Inc. was used as the thermosetting resin. CFRTP (random material) made by Toray Industries, Inc. was used as the thermoplastic resin. A thermoplastic resin molded body 100 mm long, 25 mm wide, and 3 mm thick was formed using a thermoplastic resin for preparing a thermoplastic resin molded body. Two thermoplastic resin portions each 10 mm long, 5 mm wide, and 3 mm thick were formed using a thermoplastic resin for preparing a thermosetting resin molded body. Corona discharge treatment was then performed on a surface of these thermoplastic resin portions. A thermosetting resin molded body was obtained by forming a precursor before curing of the thermosetting resin molded body using thermosetting resin and these thermoplastic resin portions, and then heating the precursor first in an oven for two hours at 135° C., and then in an autoclave for two hours at 135° C. and 0.4 MPa. The size of the thermosetting resin molded body was 100 mm long, 25 mm wide, and 3 mm thick. The two thermoplastic resin portions were then arranged, 5 mm apart with the length directions thereof being parallel to the length direction of the thermosetting resin molded body, on an end portion of the thermosetting resin molded body. The protrusion amount of the thermoplastic resin portions from the thermosetting resin molded body was set to 1 mm.

(Vibration Welding)

The obtained thermoplastic resin molded body and thermosetting resin molded body were provided for a welding test after being stored for at least 10 days in a room controlled to 25±2° C. A Branson MICROPPL (Emerson Japan, Ltd.) was used as the vibration welding machine. A resin joined body was manufactured by placing the thermoplastic resin molded body into contact with the thermoplastic resin portions of the thermosetting resin molded body, and performing vibration welding. As the welding conditions, the vibration amplitude was set to 1.8 mm, the pressure was set to 0.75 MPa, and the penetration dimension was set to 1.0 mm.

(Shear Strength Measurement)

An Autograph AG-X100KN by Shimadzu Corporation was used to perform a shearing test. The shear strength was 21.9 MPa, so it was evident that excellent joint strength was exhibited.

What is claimed is:

1. A resin joined body comprising:
    a thermoplastic resin molded body; and
    a thermosetting resin molded body having a thermoplastic resin portion embedded in the thermosetting resin molded body and exposed at a portion of a surface of the thermosetting resin molded body, the thermoplastic resin portion being welded to the thermoplastic resin molded body thereby joining the thermosetting resin molded body to the thermoplastic resin molded body,
    wherein the thermoplastic resin portion includes an anchor portion and a protruding portion,
    wherein the anchor portion is embedded in the thermosetting resin molded body, and the anchor portion has a width that is larger than a width of the protruding portion when viewed from a direction orthogonal to the surface of the thermosetting resin molded body, and
    wherein the protruding portion is connected to and extends from the anchor portion and protrudes beyond the surface of the thermosetting resin molded body and is welded to the thermoplastic resin molded body.

2. The resin joined body according to claim 1, wherein the thermoplastic resin molded body includes fibers therein.

3. The resin joined body according to claim 1, wherein the thermoplastic resin portion includes fibers therein.

4. The resin joined body according to claim 1, wherein the thermosetting resin molded body has at least two of the thermoplastic resin portions.

5. The resin joined body according to claim 1, wherein a composition of a thermoplastic resin material of the thermoplastic resin molded body is identical to a composition of a thermoplastic resin material of the thermoplastic resin portion of the thermosetting resin molded body.

6. A vehicle structure that includes the resin joined body according to claim 1.

7. A manufacturing method of a resin joined body comprising:
preparing a thermoplastic resin molded body;
preparing a thermosetting resin molded body that includes a thermoplastic resin portion embedded in the thermosetting resin molded body and that is exposed at a portion of a surface of the thermosetting resin molded body; and
joining the thermoplastic resin molded body to the thermosetting resin molded body by welding the thermoplastic resin molded body to the thermoplastic resin portion of the thermosetting resin molded body,
wherein the thermoplastic resin portion includes an anchor portion and a protruding portion,
wherein the anchor portion is embedded in the thermosetting resin molded body, and the anchor portion has a width that is larger than a width of the protruding portion when viewed from a direction orthogonal to the surface of the thermosetting resin molded body, and
wherein the protruding portion extends from the anchor portion and protrudes beyond the surface of the thermosetting resin molded body and is welded to the thermoplastic resin molded body.

8. The manufacturing method according to claim 7, wherein
the thermoplastic resin molded body includes fibers therein.

9. The manufacturing method according to claim 7, wherein
the thermoplastic resin portion includes fibers therein.

10. The manufacturing method according to claim 7, wherein
the thermosetting resin molded body has at least two of the thermoplastic resin portions.

11. The manufacturing method according to claim 7, wherein
a groove is provided in the surface of the thermosetting resin molded body around a portion where the thermoplastic resin portion is exposed.

12. The manufacturing method according to claim 7, wherein
a composition of a thermoplastic resin material of the thermoplastic resin molded body is identical to a composition of a thermoplastic resin material of the thermoplastic resin portion of the thermosetting resin molded body.

13. The manufacturing method according to claim 7, wherein
the thermoplastic resin portion is embedded in the thermosetting resin molded body before a thermosetting material of the thermosetting resin molded body is thermally cured.

14. A resin joined body comprising:
a thermoplastic resin molded body; and
a thermosetting resin molded body that includes a thermoplastic resin portion, the thermoplastic resin portion being provided exposed on a portion of a surface of the thermosetting resin molded body, and the thermoplastic resin portion being welded to the thermoplastic resin molded body,
wherein the thermoplastic resin portion includes an anchor portion and a protruding portion,
wherein the anchor portion is embedded in the thermosetting resin molded body, and the anchor portion has a width that is larger than a width of the protruding portion when viewed from a direction orthogonal to the surface of the thermosetting resin molded body, and
wherein the protruding portion extends from the anchor portion and protrudes beyond the surface of the thermosetting resin molded body and is welded to the thermoplastic resin molded body.

* * * * *